July 5, 1949. E. ENNIS 2,475,487
INDIVIDUAL DRIVE WHEEL SUSPENSION
Filed Oct. 24, 1946 2 Sheets-Sheet 2

INVENTOR.
ELMER ENNIS,
BY Victor J. Evans & Co.
ATTORNEYS

Patented July 5, 1949

2,475,487

UNITED STATES PATENT OFFICE 2,475,487

INDIVIDUAL DRIVE WHEEL SUSPENSION

Elmer Ennis, Indianapolis, Ind.; Emmett Ennis administrator of said Elmer Ennis, deceased Application October 24, 1946, Serial No. 705,313

1 Claim. (Cl. 180—73)

My present invention relates generally to improvements in automotive vehicles, and more particularly to an improved individual wheel suspension for the under-rigging of the vehicle, utilizing a suspension including a leaf spring end and a connecting lever or arm, together with a gimbal-head, in which the spring and head are anchored on the main frame or chassis of the vehicle, with the wheel intermediate these two supporting points.

In the physical embodiment of my invention the pair of front wheels and the pair of rear wheels of the automotive vehicle may be equipped with a pair of opposed identical or duplex suspension structures, to absorb strains and stresses and prevent body-sway of the vehicle in motion.

By the utilization of the individual wheel suspensions a comparatively low-hung chassis or main frame and rigging are provided consisting of a minimum number of component parts together with a complementary decreased number of bearings.

The invention consists essentially in certain novel combinations and arrangements with the main frame of the vehicle, of a resiliently supported bearing-head for the wheel, a gimbal-head, and an intermediate suspension arm, as will be hereinafter described and more specifically set forth in the claims.

In the accompanying drawings I have illustrated one complete example of the physical embodiment of my invention wherein the parts are combined and arranged in accord with one mode I have thus far devised for the practical application of the principles of my invention; but it will be understood that changes and alterations are contemplated and may be made in these exemplifying drawings and mechanical structures, within the scope of my appended claims, without departing from the principles of the invention.

The drawings illustrate in detail the individual equipment for the right rear wheel of an automotive vehicle, and inasmuch as the opposed duplex installation for the left rear wheel is identical, the description and reference to one suspension will suffice for both.

Figure 1:
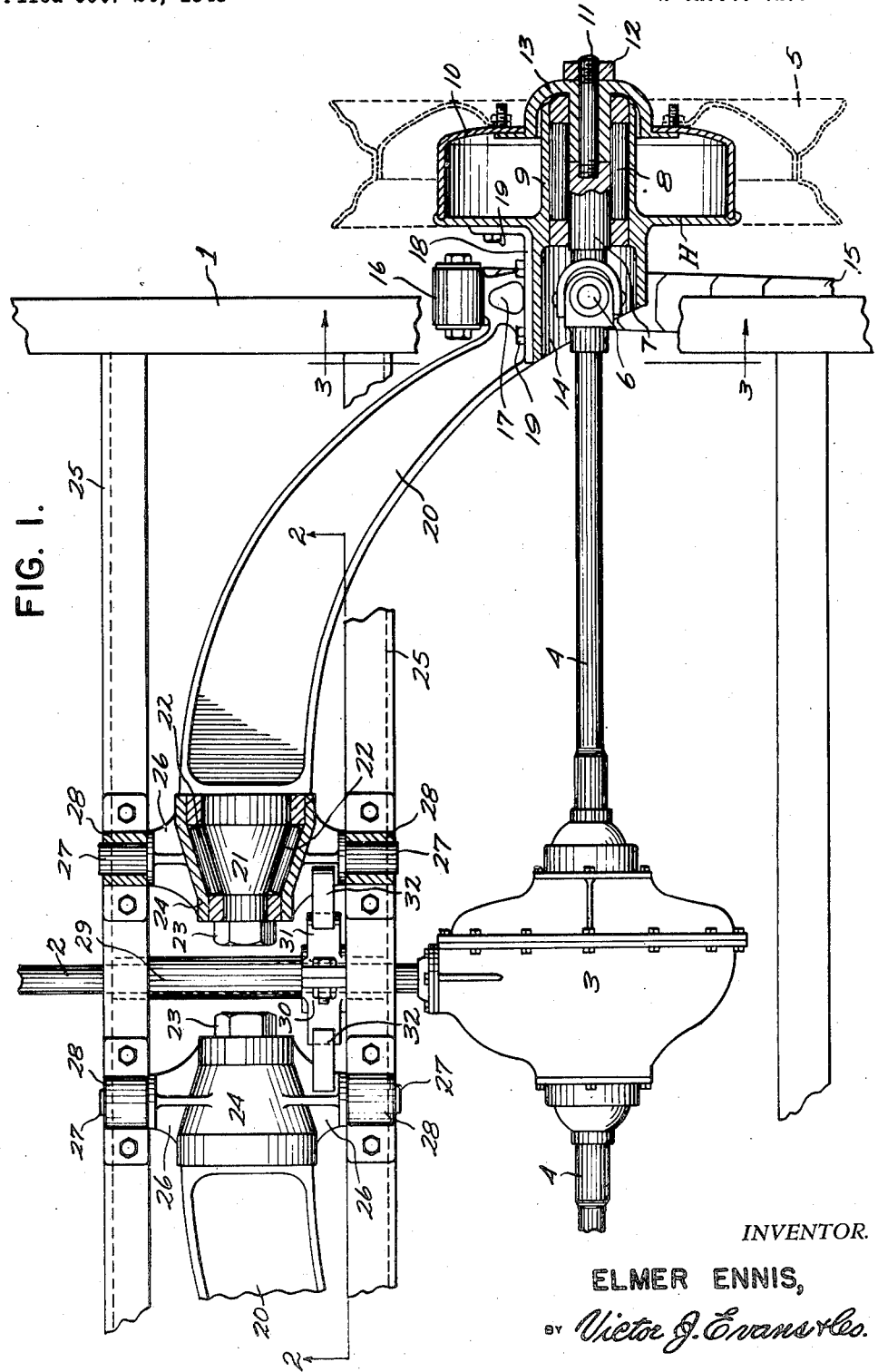
Figure 1 is a horizontal plan view at the rear end of the vehicle showing part of the chassis, a fragment of one of the individual suspensions, and with parts of the right rear wheel suspension in horizontal section.
Figure 2:
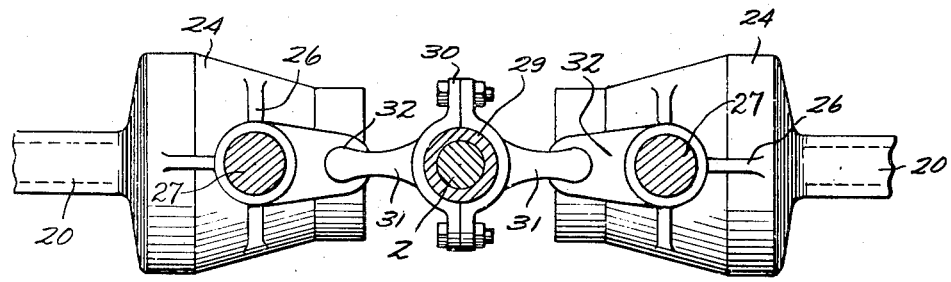
Figure 2 is a vertical sectional view as at line 2—2 of Fig. 1 showing the gimbal-heads for the two suspension arms.
Figure 3:
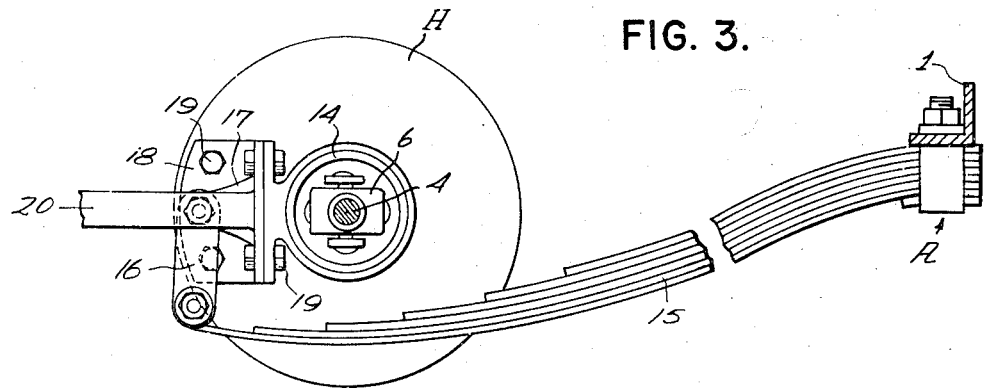
Figure 3 is a longitudinal, vertical detail view as at line 3—3 of Fig. 1 showing the leaf spring suspension and bearing head for the wheel.

In order that the general relation and assembly of parts may readily be understood I have shown in Fig. 1 a portion of the horizontal underframe 1 of an automotive vehicle, in which the longitudinally extending central power shaft 2 is journaled, and the gear-case 3 encloses the differential gearing of the two transverse driving shafts 4, 4 for the wheels, one of which is indicated at 5, in Fig. 1.

As shown, the right hand driving shaft 4 is provided with the usual universal joint 6, and stub shaft 7 journaled by bearings 8 within the stationary or nonrotary bearing head H which is fashioned with a bearing sleeve 9 within the hub 10 of the wheel.

A stud bolt 11 and lock nut 12 secure the bearing end of the driving shaft within the hub cap 13 of the wheel and the wheel, hub and hubplate revolve with the driving shaft 4.

At the inner side of the circular bearing head H an integral housing 14 encloses the joint 6 of the drive shaft, and a usual type of leaf spring 15 has one end anchored at A to a suitable part of the frame 1 while its forward end is pivotally connected by a shackle 16 with a perforated lug 17 of an angular bracket 18 that is bolted at 19 against the inner flat face of the head as well as the front flat face of the housing 14 which is integral with the head, H.

The bearing lug or boss 17 and the angular bracket 18 are integral with a horizontally disposed, curved, suspension arm or bar 20, which is rigid with the bearing head H, and the leaf spring is suspended between the frame at A and its shackle.

The suspension arm curves forwardly, and inwardly toward the longitudinally extending power shaft 2 beneath the main frame 1, and its inner end is suspended at the near side of the shaft 2 by means of a gimbal-head or two-part joint having articulations on two axes disposed longitudinally and transversely of the vehicle.

The arm 20 at its inner end terminates in a tapered reduced journal 21 disposed transversely of the vehicle and the journal is mounted in roller bearings 22, or other anti-friction devices, and retained by lock nut 23 threaded on the reduced end of the journal within a bearing sleeve 24 of the gimbal-head, to absorb transverse thrusts of the arm for stabilizing its movement.

The gimbal-head, of which the sleeve forms an integral part, is supported at one side of the power shaft on cross bars 25 of the chassis or main frame, and for this purpose the head is fashioned with a pair of diametrically arranged arms 26, 26, that terminate in trunnions 27, 27, parallel with the power shaft.

The trunnions of the gimbal-head are journaled in bearings 28 of the cross bars 25, which bars, as seen in Fig. 1, are located above the power shaft, with the trunnions 27, 27 and the journal 21 of the arm located in the same horizontal plane with the power shaft.

For stabilizing the movement of the gimbal-head on its longitudinally extending trunnions, a bearing sleeve 29 is mounted on the power shaft between the two cross bars 25, and a split collar, or sectional collar 30 is clasped or clamped by bolts on the sleeve. The sections of the collar are each provided with opposed lateral lugs 31 that engage complementary bosses 32 integral with the arms 26 of the two gimbal heads, to provide flexible connections between the two gimbal heads.

Thus it will be apparent that the gimbal head is capable of absorbing relative movements between the arm 20 on its transverse axis, as well as upon its longitudinal axis; and the connecting collar on the power shaft is adapted to rock intermediate the gimbal head for aiding the absorption of the shocks or strains of the suspension arm.

While I have illustrated a satisfactory disclosure of my invention, it will be understood that various changes may be made in the individual suspensions in order to adapt them to different types of automotive vehicles, and such changes are covered by my appended claim.

Having thus fully described my invention, what I claim as new and desire to secure by Letters Patent is:

In an automotive vehicle having a chassis frame, a drive shaft carried thereby, a power means driven by the drive shaft, a pair of coaxial rear end shafts driven by the power means, leaf spring means suspended from the frame, bearing housings attached to the leaf spring means, a pair of ground wheels rotatably mounted on the bearing housings and universal joint means connecting the rear end shafts to the ground wheels, respectively, the combination of a pair of arcuate suspension bars, means connecting one end of each bar to a respective bearing housing, a tapered journal terminating the opposite end of each bar, a pair of supports secured to the frame, a pair of arms, means pivoting said arms on said supports for movement about axes perpendicular to the axes of the rear end shafts, each said arm having a bearing sleeve, the axis of each bearing sleeve being parallel to the axes of the rear end shafts, the tapered journals of said bars being rotatably mounted in said bearing sleeves respectively, whereby said bars may oscillate simultaneously about axes respectively perpendicular to and parallel to the rear end shafts, a collar means rotatably mounted on the drive shaft for oscillation relative to the frame about an axis parallel to the axes of said arms, diametrically-opposite lugs extending laterally from said collar means toward said arms, respectively, and means pivotally connecting said lugs to said respective arms whereby oscillation of one arm causes reverse oscillation of the other arm.

ELMER ENNIS.

REFERENCES CITED

The following references are of record in the file of this patent:

UNITED STATES PATENTS

| Number | Name | Date |
|---|---|---|
| 1,165,350 | Van Vleet | Dec. 21, 1915 |
| 2,077,969 | Tibbetts | Apr. 20, 1937 |
| 2,102,923 | Szekely | Dec. 21, 1937 |
| 2,167,403 | Guerard | July 25, 1939 |